United States Patent
Cylvick

(10) Patent No.: US 10,500,509 B2
(45) Date of Patent: *Dec. 10, 2019

(54) TERMINAL-RECOIL-ATTENUATION SYSTEM AND METHOD

(71) Applicant: ZIPHOLDINGS, LLC, Wanship, UT (US)

(72) Inventor: Eric S. Cylvick, Wanship, UT (US)

(73) Assignee: ZIPHOLDINGS, LLC, Wanship, UT (US)

( * ) Notice: Subject to any disclaimer, the term of this patent is extended or adjusted under 35 U.S.C. 154(b) by 334 days.

This patent is subject to a terminal disclaimer.

(21) Appl. No.: 15/605,786

(22) Filed: May 25, 2017

(65) Prior Publication Data

US 2017/0259181 A1  Sep. 14, 2017

Related U.S. Application Data

(62) Division of application No. 14/451,932, filed on Aug. 5, 2014, now Pat. No. 9,669,319.

(51) Int. Cl.
| | |
|---|---|
| *A63G 21/22* | (2006.01) |
| *B61H 9/02* | (2006.01) |
| *B61B 7/00* | (2006.01) |
| *A63G 21/20* | (2006.01) |
| *F16D 63/00* | (2006.01) |

(52) U.S. Cl.
CPC ............ *A63G 21/22* (2013.01); *A63G 21/20* (2013.01); *B61B 7/00* (2013.01); *B61H 9/02* (2013.01); *F16D 63/008* (2013.01)

(58) Field of Classification Search
CPC .......... B61H 9/02; A63G 21/20; A63G 21/22; B61B 7/00; F16D 63/008
See application file for complete search history.

(56) References Cited

U.S. PATENT DOCUMENTS

| | | |
|---|---|---|
| 301,923 A | 7/1884 | Reisdorff |
| 551,744 A | 12/1895 | Brothers |
| 567,186 A | 9/1896 | Cassidy |
| 1,684,251 A | 9/1928 | Thomas |
| 1,935,711 A | 11/1933 | Hecox et al. |
| 2,554,548 A | 5/1951 | Albagnac |
| 2,922,625 A | 1/1960 | Heacock |

(Continued)

FOREIGN PATENT DOCUMENTS

WO    WO 95/19903    7/1995

OTHER PUBLICATIONS

Petzl, Rollcab instruction manual, p. 1-8, date unkonwn.

*Primary Examiner* — Zachary L Kuhfuss
(74) *Attorney, Agent, or Firm* — Pate Baird, PLLC

(57) ABSTRACT

A cable in suspension (clear span) supports a trolley. At the upper end, a launch block fixed to the cable registers the trolley in all directions, including a safety release link holding the trolley near the launch block. After release and descent with a rider, the trolley strikes an attenuator of distributed springs and spacers. The spring stack absorbs momentum from the trolley, but a leash limits recoil "bounce" after reversing the trolley. A second, recoil, leash resists recoil by capturing a subset of the springs between respective ends of itself and the first leash. The doubly leashed trolley will oscillate to a stop in an equilibrium position.

18 Claims, 7 Drawing Sheets

(56) References Cited

U.S. PATENT DOCUMENTS

| | | | |
|---|---|---|---|
| 3,070,035 A * | 12/1962 | Russo | A63G 21/22 104/113 |
| 3,455,866 A | 7/1969 | D'Alessandro | |
| 3,502,301 A | 3/1970 | Davis et al. | |
| 3,766,130 A | 10/1973 | Johnson | |
| 3,927,867 A | 12/1975 | Herchenroder | |
| 3,949,679 A | 4/1976 | Barber | |
| 4,003,314 A | 1/1977 | Pearson | |
| 4,069,765 A | 1/1978 | Müller | |
| 4,150,011 A | 4/1979 | Searfoss et al. | |
| 4,223,495 A | 9/1980 | Peter | |
| 4,457,035 A | 7/1984 | Habegger et al. | |
| 4,646,924 A | 3/1987 | Dayson | |
| 4,681,039 A | 7/1987 | Perrin | |
| 4,757,650 A | 7/1988 | Berger | |
| 4,934,277 A | 6/1990 | Smith et al. | |
| 5,060,332 A | 10/1991 | Webster | |
| 5,094,171 A | 3/1992 | Fujita | |
| 5,134,571 A | 7/1992 | Falque et al. | |
| 5,224,425 A | 7/1993 | Remington | |
| 5,390,618 A | 2/1995 | Wolff et al. | |
| 5,433,153 A | 7/1995 | Yamada | |
| 5,513,408 A | 5/1996 | Minakami et al. | |
| 5,853,331 A | 12/1998 | Ishikawa et al. | |
| 654,687 A | 7/2000 | Suter | |
| 6,170,402 B1 | 1/2001 | Rude et al. | |
| 6,622,634 B2 * | 9/2003 | Cylvick | A63G 21/22 104/53 |
| 6,666,773 B1 * | 12/2003 | Richardson | A63G 21/22 104/204 |
| 7,066,822 B2 | 6/2006 | Cochran | |
| 7,966,940 B2 * | 6/2011 | Cylvick | A63G 21/22 104/113 |
| 8,807,292 B2 * | 8/2014 | Liston | A63G 21/20 104/113 |
| 9,669,319 B2 * | 6/2017 | Cylvick | A63G 21/22 |
| 10,010,798 B2 * | 7/2018 | Cylvick | B61L 23/14 |
| 10,053,115 B2 * | 8/2018 | Cylvick | B61B 12/007 |
| 10,150,487 B2 * | 12/2018 | Cylvick | B61B 12/002 |
| 10,173,699 B2 * | 1/2019 | Cylvick | B61B 12/02 |
| 10,213,700 B2 * | 2/2019 | Cylvick | A62B 1/20 |
| 2002/0162477 A1 * | 11/2002 | Palumbo | B61B 7/00 104/87 |
| 2003/0066453 A1 | 4/2003 | Cylvick | |
| 2004/0134727 A1 | 7/2004 | Windlin | |
| 2004/0198502 A1 | 10/2004 | Richardson | |
| 2005/0029058 A1 | 2/2005 | Everett et al. | |
| 2005/0081738 A1 | 4/2005 | Meindl | |
| 2006/0137563 A1 | 6/2006 | Cummins | |
| 2006/0288901 A1 | 12/2006 | Cylvick | |
| 2007/0039788 A1 * | 2/2007 | Fulton | B60L 7/28 188/164 |
| 2008/0121470 A1 | 5/2008 | Cylvick | |
| 2012/0031296 A1 * | 2/2012 | Smith | B61B 7/00 104/113 |
| 2017/0259181 A1 * | 9/2017 | Cylvick | A63G 21/22 |
| 2018/0304907 A1 * | 10/2018 | Richardson | B61B 12/028 |
| 2018/0369700 A1 * | 12/2018 | Cylvick | B61L 23/14 |
| 2019/0039629 A1 * | 2/2019 | Cylvick | B61B 12/007 |

* cited by examiner

TERMINAL-RECOIL-ATTENUATION SYSTEM AND METHOD

RELATED APPLICATIONS

This application: is a divisional (continuation) of U.S. patent application Ser. No. 14/451,932, filed Aug. 5, 2014, which is hereby incorporated by reference.

BACKGROUND

1. Field of the Invention

This invention relates to amusement rides and, more particularly, to novel systems and methods for cable rides such as zip lines.

2. Background Art

Zip lines have existed for decades. In its most basic form, a zip line is a cable (wire rope) extending from an upper anchor to which it is fixed to a lower anchor to which a lower end of the cable is fixed. A rider suspends from a pulley traveling along the cable. The pulley may support a user holding on to a simple cross-bar handle, seated in a climbing harness, or seated on some other contrivance, such as a boatswain's (bo'sun's) chair or the like.

Cable cars and various cable and transporting systems have existed for over a hundred years, many dating to mining technologies of the nineteenth century. Some rely on a rolling pulley connecting a vehicle traveling along a fixed cable. Some rely on a moving cable fixed to a vehicle. Yet others may rely on a cable to pull a vehicle along a track, road, path, or body of water. Meanwhile, various cable-supported chairs and gondolas exist in the ski industry as lifts for skiers, but they operate on a very different principle.

Cable rides are problematic in that an uncontrolled descent is dangerous, perhaps even fatal. Meanwhile, hand controlled brakes have been proposed by the inventor in U.S. Pat. No. 7,404,360, issued Jul. 29, 2008, U.S. Pat. No. 7,966,940, issued Jun. 28, 2011, U.S. Pat. No. 8,333,155, issued Dec. 18, 2012, and automatic braking systems as documented in U.S. Pat. No. 7,637,213, issued Dec. 29, 2009, U.S. Pat. No. 6,622,634, issued Sep. 23, 2003, and U.S. Pat. No. 6,666,773, issued Dec. 23, 2003, and retrieval systems in U.S. Pat. No. 7,299,752, issued Nov. 27, 2007, and U.S. Pat. No. 8,240,254, issued Aug. 14, 2012, all of which are hereby incorporated by reference in their entirety. They describe towers, cables suspended between the towers, and various trolleys, braking systems, retrieval systems, and the like.

What is needed is a system that will provide safe absorption of the kinetic energy of motion of a rider suspended under a trolley of any particular type. Also needed is a system for minimizing or eliminating recoil. Also needed is a system that will stop and position a user sufficiently gently to cause no injury to the rider, no damage to the system, and not risk leaving a rider spaced an inconvenient distance away from the cable termination point. Thus, what is needed is a system that can reliably stop a rider through an extended distance of space, and yet return the rider to the same predicable unloading station every time. A system is needed to return the rider to a predetermined, preferably consistently identical unloading station, typically at a deck proximate a lower end of a descending cable ride.

BRIEF SUMMARY OF THE INVENTION

A system in accordance with the invention includes one or more cables suspended between two towers (an upper and a lower). Multiple cables may also be suspended in sequence to form a canopy tour or other multiple-leg route. Typically, a trolley assembled with fasteners and one or more supporting axles will travel downward on a corresponding number of wheels or pulleys along the cable. Any suitable trolley may be handled by the systems, devices, apparatus, and methods described hereinbelow in accordance with the invention. Specifically, each and all of the trolleys disclosed in the documents incorporated hereinabove by reference, are contemplated as serving with at least one embodiment of a recoil attenuation apparatus and method in accordance with the invention.

In one embodiment, an apparatus may include a cable having a central axis defining a longitudinal direction and extending therealong between first and second ends and central to a diameter of the cable. The cable, being held in suspension may be a clear span extending unsupported between the first end and the second end, the second end being lower than the first end. A trolley, comprising at least one wheel rollable along the cable may interact with a launch block fixed to the cable proximate the first end. The trolley may include a hanger selectively removable from and securable in at least one hanger slot in the trolley to support a seat and rider below the trolley.

The launch block is typically shaped to register the trolley with respect to the cable, in all directions (axially along the cable, and circumferentially, while the cable itself secures both of them together radially). That is, the trolley may be shaped to register with the launch block in two dimensions, and simply be constrained by the cable to register in a third dimension distinct from the first and second dimensions.

A link registers the launch block with the trolley in the longitudinal direction at the upper end of the cable. That is, it holds the trolley against or in close proximity to the launch block, which is fixed to the cable. A key extends from at least one of the trolley and the launch block to register the trolley in a circumferential direction orthogonal to the longitudinal direction. Meanwhile, a receiving slot formed in the other of the trolley and the launch block has side surfaces registering with the key to resist relative rotation therebetween about the cable.

At the lower end of the cable an attenuator comprising springs arranged along the cable in a first set is arranged along the lower end of the cable. A latch block comprising a latch shaped to capture the trolley upon arrival thereof at or near the latch block is connected to a recoil leash that will restrain movement of the trolley and latch block away from the attenuator once the latch block and trolley engage one another.

Spacers, each comprising a spacer mass corresponding thereto and positioned between adjacent ones of the springs are sized and shaped to travel along the cable absorbing momentum from the trolley, at the end of its run down the cable, by at least one of acceleration of the spacer mass thereof and frictional drag with respect to the cable. An impact leash has a fixed end and a movable end, the movable end being connected to constrain the first set of springs against movement away from the second end more than a pre-selected first distance. A recoil leash connects to the latch block to constrain a second set (subset) of the springs to remain between the latch block and the movable end of the impact leash. The second set is typically a "proper subset" (less than all) of the first set. The impact leash and the recoil leash define an equilibrium position of the latch block for receiving the trolley repeatedly and repeatably.

The latch block is further provided with a release slot receiving the cable and sized to provide to the latch block a degree of freedom with respect to the cable in a vertical direction. The latch is operable to be removable from engagement with the trolley when the trolley stops stably at an equilibrium position proximate the second end. Thus, the trolley may be moved back up the cable or removed for transport in another way or to another location. Particularly, the "touring" type of trolley is sized and shaped to be readily removable from the cable at the equilibrium position without the use of tools.

A seat suspended from the trolley is shaped to support a user below the cable. It may be a climbing harness, fabric chair, rigid chair, or the like. From it, a release may be operable, by at least one of an operator proximate the seat or a rider in the seat, to free the trolley from the launch block.

Springs each have a spring constant corresponding thereto and defining a force per unit of deflection. Between springs may be placed spacers, each comprising a spacer mass corresponding thereto. They aborb momentum by virtue of acceleration of their mass. Spring absorb momentum by virtue of acceleration of their mass and compression of their length (spring force according to Hooke's law).

The recoil leash is connected to the latch block to capture the second set (the subset) of the springs to restrain travel of the latch block and trolley in recoil resulting from a tendency to launch the trolley and rider backwards by release of the force of compression among the first set of the springs stopping the trolley and its load.

Configured as an amusement ride, one embodiment may include a cable having a central axis defining a longitudinal direction and extending therealong between first and second ends and central to a diameter of the cable being held in suspension as a clear span extending unsupported between the first end and the second end, the second end being lower than the first end. A loading station comprising a space proximate the first end and therebelow and sized for receiving a rider may be matched by an unloading station comprising a space proximate the second end and therebelow and sized for admitting the rider. The trolley is shaped to register with the launch block in two dimensions, and constrained by the cable to register in a third dimension, distinct from and orthogonal to the first and second dimensions.

A link secures, and may register, the launch block with the trolley in the longitudinal direction.

In certain embodiments, a suspension system shaped to support a rider below the trolley may include a rod sized and shaped to fit between side plates of the trolley when oriented along the direction of the cable. The rod is selectively positionable between a first position oriented longitudinally parallel to the cable and movable up and down between the side plates, a second position transverse to the cable and extending through the window portion of the slot in each of the side plates, and a third position below the second position, with the rod captured by the well portion of the slot in each of the side plates. It is so positionable without the use of tools. Once in the well portion, the rod is pivotable (fore and aft0 with respect to the side plates during the capture in the well portions.

A method of use may include providing an amusement ride comprising a cable having an upper end and a lower end, a trolley operable along the cable and supporting a seat sized to accommodate a rider, a launch block fixed to the cable proximate the upper end, an attenuator comprising springs proximate the lower end, and a latch block leashed to constrain the springs against movement more than a pre-selected distance from the lower end. Engaging, by the trolley, the cable will sustain the trolley thereon. Locking the trolley to the launch block may be done direction or with a link therebetween to fix the trolley to the block which is fixed to the cable. Thus the trolley is stable in all dimensions for loading a rider into the harness suspended therebelow.

The ride begins by releasing the trolley to travel from its position at or against the launch block near the upper end of the cable to an attenuator at or near the lower end. Impact of the trolley transfers the momentum of the trolley (with that of its rider) to the attenuator, which compresses springs. As the springs recoil, they transfer back to the trolley a portion of the momentum. The attenuator restrains recoil of the trolley from being flung back due to the recoil of that portion of the momentum.

In one embodiment of a method of attenuating recoil of a trolley on a cable, selecting a cable having an upper end proximate a first support and declining toward a lower end proximate a second support is followed by selecting a trolley. The trolley is securable to travel along the cable from proximate the upper end to proximate the lower end where a group of springs or other resilient members are distributed along a portion of the cable.

A first leash limits the distance from the second support to a first (first to see trolley impact) resilient member. A second leash does the same for a subset (less than all) of the springs selected in stiffness and number from those closest to the impact location of the trolley. The second leash limits recoil. Also, the first leash limits the entire set of springs (resilient members) from over shooting their initial positions from which they originally limited (absorbed momentum from) the forward motion of the trolley and rider.

a spacer, and thus a spring associated with it, is positioned intermediate the first spacer (and its corresponding resilient member) and the second support (e.g., lower tower). Typically, all the resilient members are distributed and separated from each other by spacers positioned between adjacent resilient members. This saves damage, tangling, drooping, buckling, and other failures of operation or materials.

In one alternative embodiment a system may include a trolley comprising a frame, at least one wheel positioned to carry the frame along a line suspended between an upper end and lower end thereof, and a first engagement mechanism secured to the frame. A recoil attenuation system comprising spacers and resilient members, each separated from adjacent ones by a spacer. A fixture riding between the trolley and the recoil attenuation system has a latch positioned and shaped to secure the trolley to the recoil attenuation system by selectively securing the engagement mechanism.

Recoil attenuation is accomplished by a first leash constraining the spacers against movement away from the lower end more than a pre-determined distance and a second leash constraining motion of the fixture and trolley away from the second end by engaging in compression at least one, but not typically all, of the resilient members.

The fixture has a first connector secured against traveling away from the lower end by the first leash. The fixture has a second connector securing the second leash to the midst of the spacers among the springs. the leashes may be threaded through apertures formed through the spacers and sized to receive them therethrough.

At or near the initiation or top of the descent path of a trolley along the cable, the trolley may be registered in a launch block and maintained in position by a link, which may have a pin and bail. For example, a snap shackle on a cable link may hold the trolley in close proximity to a launch block such that a key on the trolley or launch block will match and fit into a slot on the other. Thus, the snap shackle and the associated line or link may keep the trolley and the launch block in close enough proximity to maintain the key in the slot to maintain registration (position). Upon pulling a lanyard or handle, a pin in the snap shackle or other such release device may release a bail freeing the trolley from the launch block to roll down the cable.

The trolley may include a rider-operable braking system, an automatic braking system, or no braking system at all. Such systems are described in the above identified patent documents incorporated herein by reference.

After the trolley descends down the cable from the upper end to the lower end, an attenuator will absorb the kinetic energy of the trolley and rider. In certain embodiments, a latch block may connect to a first spacer or first mass terminating a stack of springs. The springs will be compressed by the kinetic energy of the trolley and rider. In certain embodiments, the latch block is free enough to ride up and down on the cable as well as sliding along it under the influence of the springs, the trolley, or both.

For example, a coupler may be formed to be positioned next to a termination spacer or block connected to the extreme uppermost end of a spring stack (stack of springs, typically compression coils, which may be graduated in stiffness). The coupler holds the latch block, but permits the latch block a degree of freedom vertically. Otherwise, the latch block travels with the coupler longitudinally along the cable.

As the rider and trolley arrive at the attenuator, the latch block captures a spur on the trolley as the trolley impacts a face of the latch block. Thus, a bumper portion of the trolley may strike the latch block, and the latch block may lift or otherwise move in order to engage a spur or barb on the trolley. Thus, the latch block and trolley are then fixed together with respect to an axial direction along the longitudinal direction of the cable.

As the momentum of the trolley and rider continue to compress the stack of springs, the momentum compresses a series of springs, separated by spacers therebetween. Eventually, the spring force overcomes the momentum, acting according to Hooke's law. That is, the force is equal to the distance traveled multiplied by the spring contact, and acting opposite to the direction of motion.

Once the trolley has come to a stop, the springs then begin to recoil, extending away from the lower tower and back upwardly or in the upward direction along the cable. Thus, the trolley and rider are accelerated in reverse of the direction that they traveled down the cable. However, leashes are connected between certain portions of the system. These leashes limit the amount of recoil and counter recoil that may occur.

For example, one leash is connected from proximate the lower tower, and extends out to the last or most distant spacer that forms the effectual end cap for the last or most distant spring. That terminal or impact spacer is the first affected by an arriving trolley. The latch block is not secured to that last impact spacer or end spacer.

Meanwhile, another leash extends from the latch block, passing through several of the spacers and eventually terminating by securement to one of the spacers that serves as a terminal spacer. We may refer to the impact spacer as the spacer closest to the latch block, and thus the first to feel the impact of the trolley. The recoil spacer is responsible to trap a subset of the springs and compress them against the impact spacer during recoil. Upon initial compression, the springs operate in a normal way, with each of the spacers acting as a friction producing element as well as a mass element absorbing momentum by their own acceleration.

During recoil, the springs all begin to expand again toward their original lengths. However, the momentum of the trolley and rider will be reversed from their original impact direction. That momentum backward may (and typically would) launch the rider and trolley out away from the spring stack. To resist this, the recoil leash captures between the recoil spacer and the impact spacer a certain number of intervening springs and spacers, preselected, and engineered as to their dimensions and spring constants.

Meanwhile, the impact leash does not permit any of the springs to extend past their initial positions where they were when initially engaged by the trolley. Thus, the impact spacer serves as a stop for the compression of the springs captured between it and the recoil spacer.

The recoil spacer is drawn by the momentum of recoil (reversed direction of the trolley) away from the end tower and back in the upper direction along the cable by the momentum of the recoil of the trolley and the rider. However, once again, the momentum of the trolley and rider must eventually be terminated by the continuing deflection of the springs, bringing the rider and the trolley to a stop from the recoil. Thus, the rider and trolley are again accelerated toward the entire spring stack, where they will impact and come to a halt.

Eventually, the two spring stacks, the one (full set) running from proximate the tower to the impact terminal spacer and the other (subset) extending between the recoil terminal spacer and the impact terminal spacer, will resist recoil. Eventually, the spring stack must come back to its initial equilibrium position because the impact leash terminates the attenuator at the impact spacer.

The rider is thus brought to a halt, at the same predictable location every time. The rider may exit the harness or seat suspended from the trolley. Thereafter, the latch on the latch block may be released to remove the trolley or to permit the trolley to be drawn back to the upper reaches of the cable for another run.

Thus, in general, the process begins by setting the trolley at a location on the cable, which may include setting the trolley on the cable. This may include securing the trolley to the cable so that it may not exit or jump off. This may be done previously or may be done subsequently depending on whether the ride is an amusement ride or whether it is a canopy tour where a rider may move a trolley from line to line (cable to cable) along a route.

Next, registering the trolley with the launch block involves securing the tongue or key in a slot after which they are shackled together. At this point one may secure the suspension system for the trolley, which may or may not be pre-secured to the trolley. Typically an operator will verify that the rigging is proper before loading or making ready a rider in the harness or seat suspended by the trolley.

Releasing the trolley from the launch block permits descending by the rider and the trolley either with a brake operated by the user, an automatic, self-controlling brake, or with no brake. The impacts are first the trolley against the latch and then against a face of the entire latch block. Then, the recoil is followed by again recompressing (to a lesser extent) the spring stack, and possibly additional recoil.

Meanwhile, the impact of the latch block against the trolley is matched by the oblique impact of the latch itself (part of the latch block) against a barb or spur on the trolley to latch the two together.

The mass and spring response then occurs with the trolley and rider being secured to the spring stacks since they may not separate from the latch block.

The system comes to a stop (which is only temporary), followed by recoil which is also temporary. Recoil moves the trolley and rider in the backward direction compared to that in which they were traveling in the descent. Again, counter-recoil then also occurs in conjunction with recoil until both spring stacks (impact or full, and recoil or subset) come to a halt, and the trolley and rider come to a full stop. At this point, unloading the rider and resetting the ride from the beginning or onto another cable may proceed.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
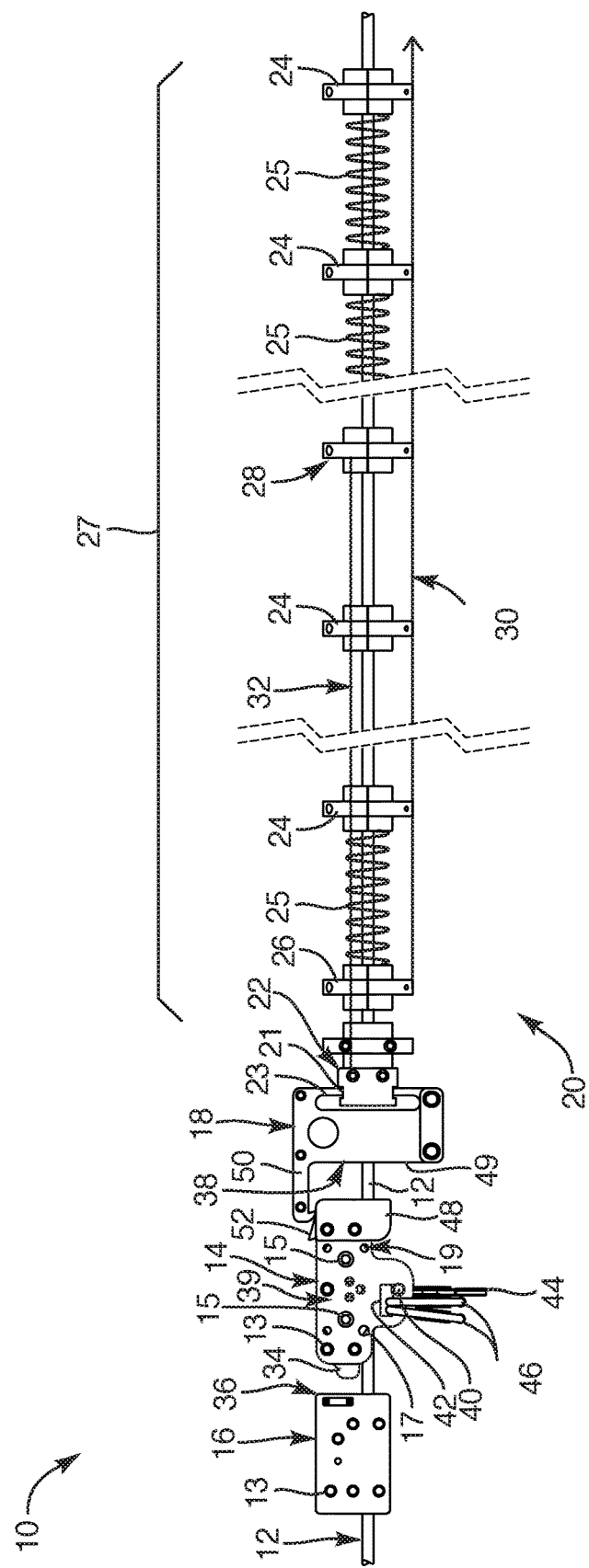
FIG. 1 is a side elevation view of one embodiment of a system in accordance with the invention illustrating a launch block, a trolley with a hanger for supporting a rider, a latch block, spacers, and the springs for end-of-ride momentum absorption, all foreshortened onto a single length of cable, notwithstanding it would normally be distributed between an upper end of a cable ride, and a lower or terminal end thereof.
Figure 2:
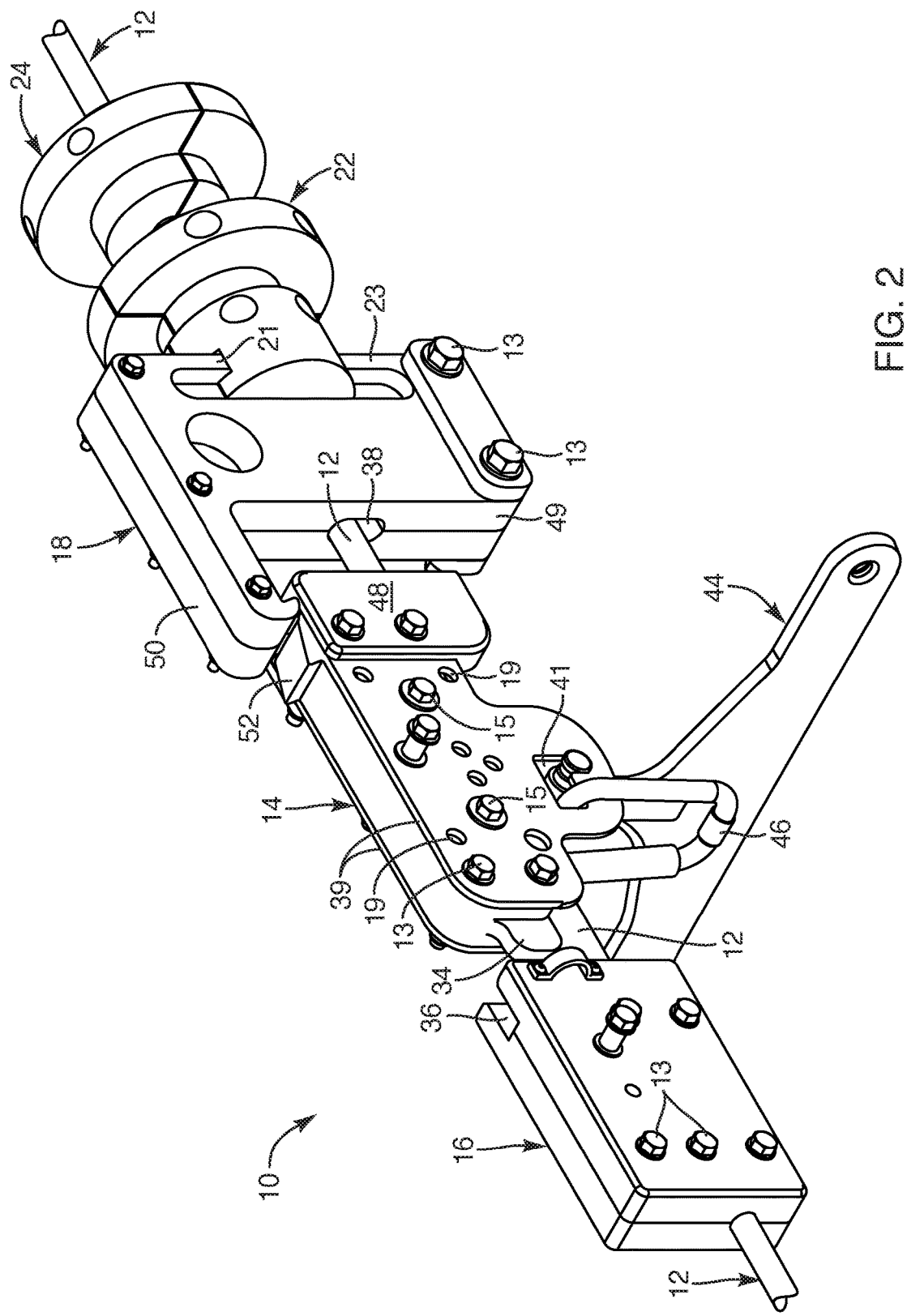
FIG. 2 is a perspective view of certain details of a launch block, trolley, and latch block in accordance with the invention
Figure 3:
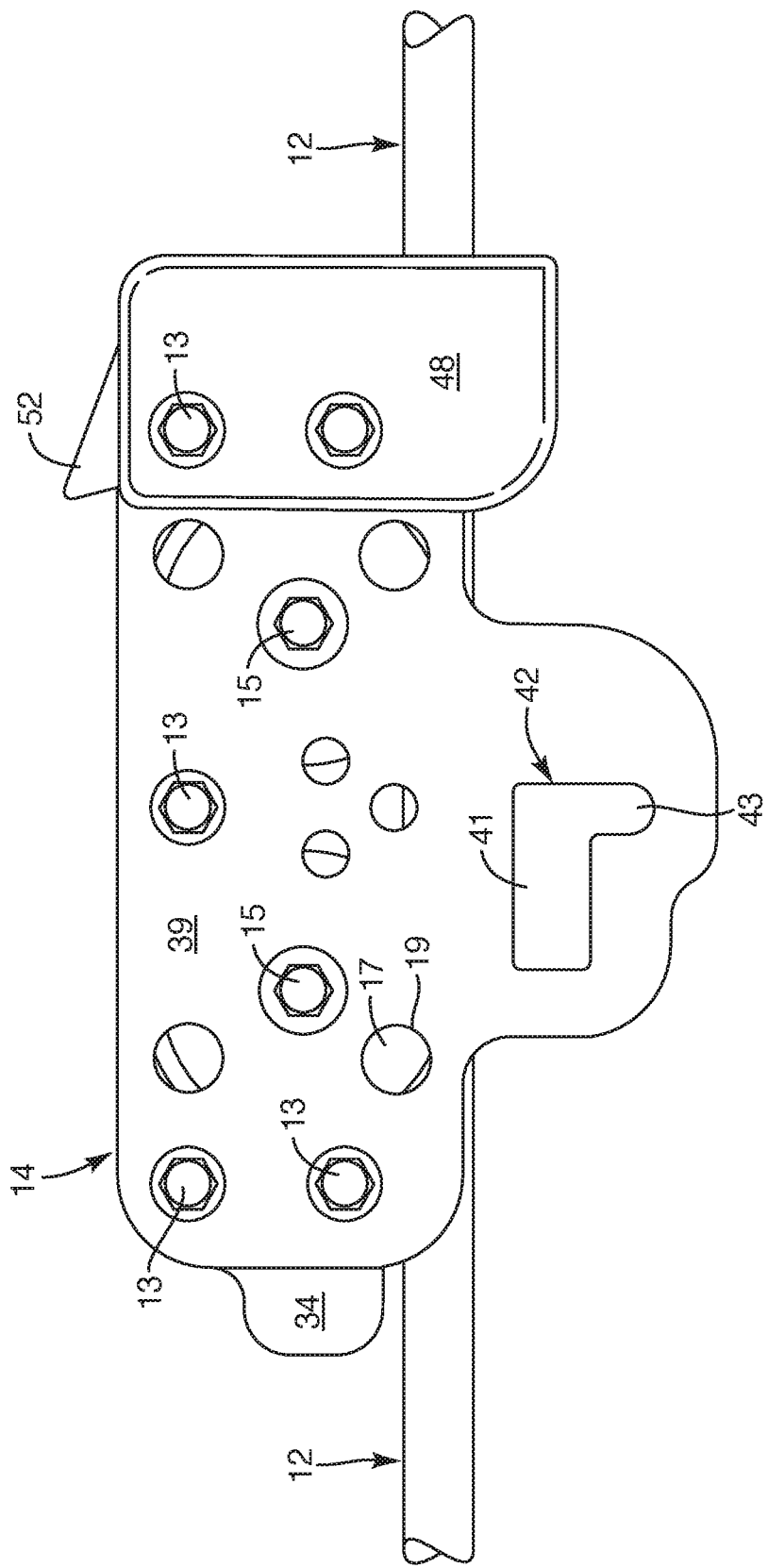
FIG. 3 is a side elevation view of one embodiment of a trolley.
Figure 4:
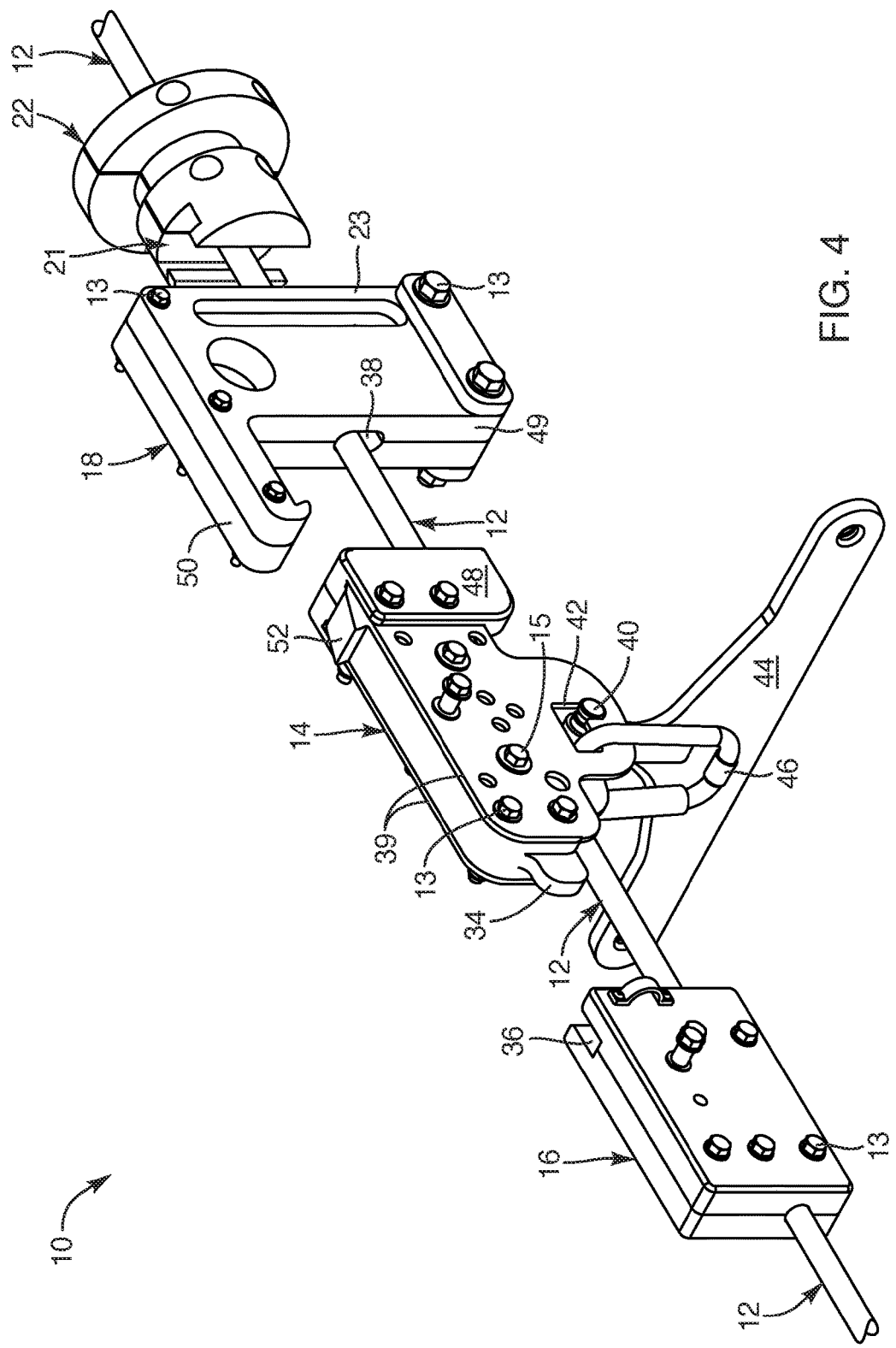
FIG. 4 is a perspective view of the system of FIG. 2, showing installation of one embodiment of a spreader bar for supporting a rider harness or seat, and showing the latch block separated from the trolley, with the coupler separated (exploded view) from its normal position of sliding up and down with respect to the latch block.
Figure 5:
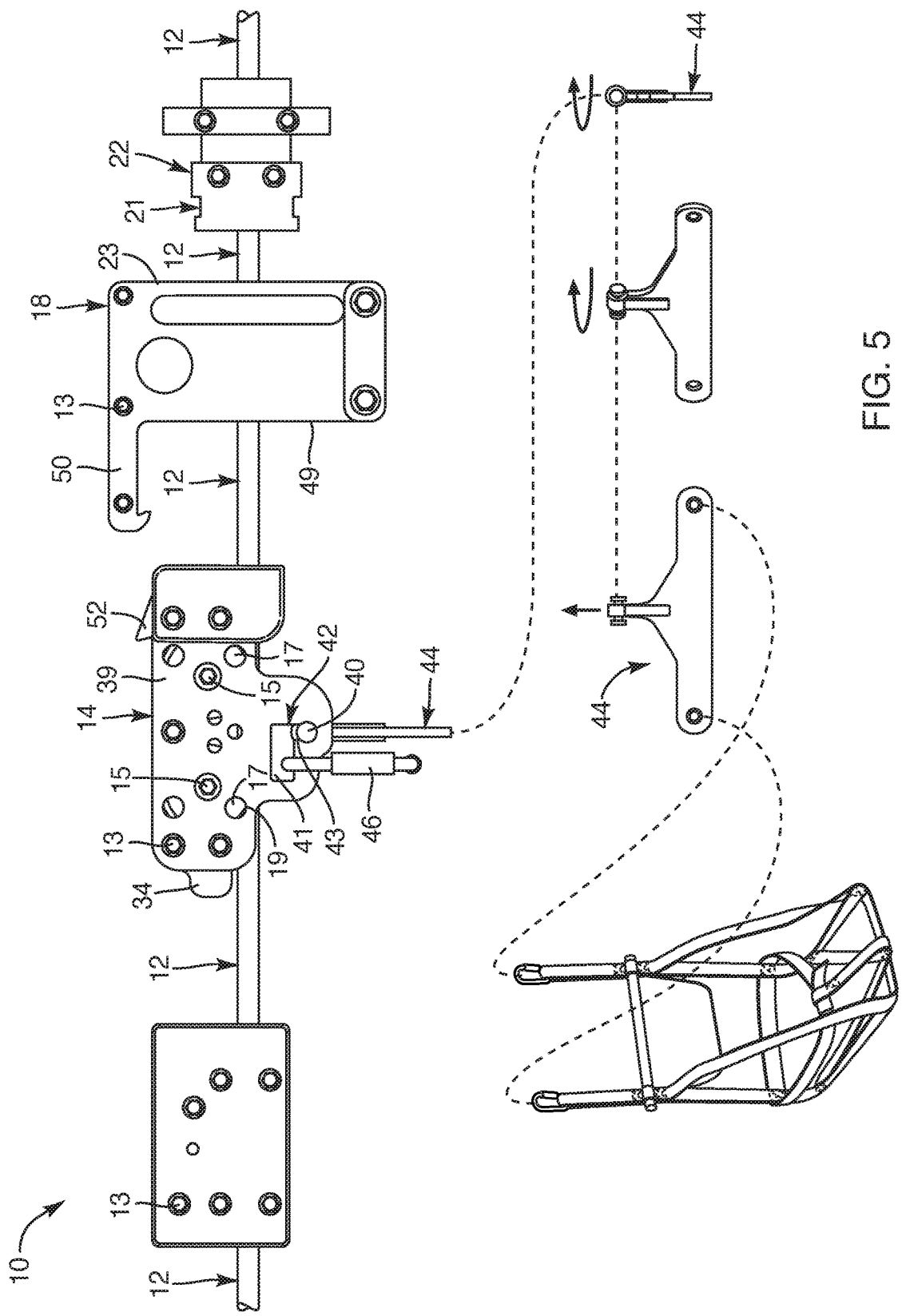
FIG. 5 is a side elevation view of the apparatus of FIG. 4.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, while referring generally to FIGS. 1 through 7, an apparatus and method in accordance with the invention may include a system 10 suspended between two towers, one higher than the other, thus providing a declining route along a cable 12. Typically, fasteners 13 may pull together the components that form a trolley 14. The trolley 14 supports axles 15. The actual axles 15 permit rotary motion of any particular type of friction reducing mechanism, whether slides, wheels, pulleys, or the like, including (as shown here) the pulleys 17 or wheels 17.

In the illustrated embodiment, the trolley 14 registers near the upper end of the cable 12 typically near the launch tower or the launch platform that is supported at such a tower or the like. The launch block registers (fixes the position) of the trolley 14 at an upper end of the cable. Typically, the fasteners 13 on the launch block 16 also operate as clamps to hold the launch block 16 in rigid position with respect to the cable 12.

Meanwhile, a latch block 18 is illustrated, but is illustrated next to the trolley 14 with which it will interact. In reality, the trolley 14 is launched from the launch block 16 at the upper end of the cable 12 and is captured by the latch block 18 at the lower end of the cable 12 near the lower tower, supporting tower. Thus, the launch block 16 and latch block 18 may be a quarter mile, a half mile, a mile, or more apart along the cable 12.

The launch block 16 does not move with respect to the cable 12. The latch block 18 does move with respect to the cable 12. Meanwhile, the trolley 14 rolls along the cable 12 from the launch block 16 at the upper end of the cable 12 to the latch block 18 at the terminal end of the cable 12.

One may see ports 19 that are basically apertures 19 formed in the trolley 14 in order to be able to see the inner workings thereof. Better seen in other illustrations is the pulley 17 or pulleys 17 that operate as the wheels 17 on the axles 15. These provide the reduced rolling friction, as opposed to any sliding, along the cable 12 by the trolley 14.

At the terminal end or near the terminal (downhill) tower supporting the cable 12 is situated an attenuator 20. The attenuator 20 operates to provide both momentum absorption, and attenuation or dissipation of that momentum through several mechanisms including spring compression, spring extension, frictional movement, acceleration of distributed masses of springs, spacers, and other components, and so forth.

In the illustrated embodiment, a way 21 is formed in a coupler to receive a slide 23 within the way 21. The significance of the way 21 and slide 23 is that the coupler 22 is responsible to guide the latch block 18 vertically. The coupler couples to the cable 12 and to a recoil leash that interacts with the system of spacers 24 and springs 25 interconnecting the spacers 24. The coupler 22 is not connected directly to the springs 25 in the spring stack 27 of the attenuator 20.

One will note that multiple springs 25 are separated from one another by intervening spacers 24. The spacers 24 serve as masses 24, and stabilizers 24 for the springs 25, to assure that the springs do not tangle or damage one another. Spacers 24 also operate as friction producers 24.

For example, each spacer 24 has a preselected weight or mass that will have to be accelerated in order for that particular spacer 24 to move. Similarly, each of the springs 25 has a spring constant, which spring constant will control the resistance of that spring to compression by the incoming momentum of a rider and trolley 14.

Thus, the springs 25 and spacers 24 may be engineered to each have their own specific mechanical properties. For the springs 25, there is a mass, and a spring constant that will be significant. For each of the spacers 24 there will be a mass, a coefficient of friction against the cable 12 and a connection to adjacent springs 25. The connection to adjacent springs 25 assures that the springs 25 will not collapse, buckles fall, entangle with one another, or the like, but will stay centered about the cable 12.

Any two spacers 24, and any two springs 25 may thus be somewhat or entirely distinct from one another. Also, certain groups of each may be distinct from other groups thereof in their outermost diameters, their lengths, their masses, the wire diameter of which a spring 25 is formed, and so forth. In particular, different specific spacers 24 may provide distinct functionality as well.

For example, an impact spacer 26 or terminal impact spacer 26 may be the first spacer 24 contacted by the latch block 18 or its coupler 22, and the first to feel the impact of the trolley 14. Moreover, the spacer 26 or impact spacer 26 is also connected by a leash 30 to a fixed location near the terminal end or lower tower end of the cable 12. The leash 30 leashes the impact spacer 26, thereby maintaining or defining the maximum distance that the impact spacer 26 may move away from the lower tower or the lower end of the cable 12.

In the typical embodiment, the springs 25 will all remain at all times subject to a slight amount of compression. By slight is meant not necessarily enough compression to dramatically effect the stopping of the trolley 14 without considerably more motion.

Nevertheless, by maintaining each of the springs 25 in slight compression, the registration distance or length of the leash 30 positions the impact spacer 26 at the same location every time that the trolley 14 arrives.

One my also note a recoil spacer 28 or terminal recoil spacer 28. The recoil spacer 28 is located at the end of another leash 32 or recoil leash 32. The recoil leash 32, connects the recoil spacer 28 back to the coupler 22. The coupler 22 serves to register the latch block 18 along the cable 12. Nevertheless, the way 21 in the coupler 22 allows the slide 23 of the latch block 18 to slide up and down (vertically, radially with respect to the cable). Accordingly, the latch block 18 my lift up with respect to the cable 12 in order to allow the trolley 14 to impact the latch block 18. Thereafter, the latch block 18 drops down to capture the trolley 14.

In operation, the momentum of a rider suspended from the trolley 14, along with the weight of the trolley 14, will strike the latch block 18, causing the latch block 18 to first lift up and then settle back into a capture position. Therein, the coupler 22, latch block 18, and the trolley 14 are now connected in an axial direction (along the longitudinal direction of the cable 12). Axially, they move together in substantially rigid body motion, since they are coupled at least in that longitudinal direction.

As the various springs 25 are compressed due to the applied loads, and various spacers 24 are accelerated by absorbing momentum from the rider and trolley 14, the spacers 26 all move to the right in the illustrated embodiment, as does each of the spacers 24. When the momentum of the trolley 14 and rider have been completely absorbed, the trolley 14 and rider will come to a stop.

Then the springs 25 will all begin to re-expand to their original length, moving the spacers 24 toward the left in the illustrated embodiment. At some point, the trolley 14 and latch block 18 connected together will reach the location where the impact leash 30 stops the impact spacer 26. Since momentum will not instantly change or will not instantly dissipate, the trolley 14, rider, and latch block 18 will continue moving with the coupler 22 away (to the left in the illustration) from the impact spacer 26.

This opens up a gap between the impact spacer 26 and the coupler 22. However, the leash 32, which is the recoil leash 32, now begins to compress all of the springs 25 captured between the recoil spacer 28 (in the stack on the right) and the impact spacer 26 (on the left). Thus, a subset of the entire stack 27 is now being compressed by the recoil momentum of the trolley 14 and rider. This compression occurs because backward moment of the trolley 14, latch block 18, and rider are drawing the recoil spacer 28 toward the now fixed (by the impact leash 30) impact spacer 26. This compresses any intervening springs therebetween.

One may see how the subset of springs 25 captured by the recoil spacer 28 will eventually bring the trolley 14 and rider to a stop some distance away from the impact spacer 26. At that time, the trolley 15, latch block 18, and rider will come to a standstill with respect to the cable 12 for a moment before they all commence to return toward the impact spacer 26 again.

Arriving at the impact spacer 26, the components and rider again compress the springs 25, move the spacers 24, and otherwise transfer momentum. One may see that the acceleration of the spacers 24 and springs 25, and the forces applied by the springs 25, resist the trolley 14 approaching the lower end of the cable 12. The springs 25 push the trolley 14 and rider back in recoil. Then the subset of springs 25 draws the trolley again toward the impact spacer 26 and the lower end of the cable 12.

Springs 25 may be advantageously made of metal in order to minimize their mass and consequent momentum. Typically, helical compression springs 25 have been found effective. However, other shapes may be selected, engineered, or otherwise employed, including blocks, tubes, cages, grids, plates, disks, and so forth. Likewise, any resilient material including polymers such as elastomeric polymers can serve as material for springs 25, regardless of shapes of these spring elements 25. For example springs 25 may be foamed, solid, or shaped (e.g., helical, oblate, polygonal, spherical, disk, cylinder, dished Bellville disks, hollow, filled, or the like, and so forth) in order to optimize their spring constants, masses, momentum transfer, energy absorption, and so forth.

For example, in certain embodiments, a spring may be an elastomeric foam ball, elastomeric foam egg, an elastomeric foam cylinder, polymeric Bellville washer/spring, plastic helical spring, "rubber" (any elastomeric material) block as a solid, matrix, foam, or the like. The selection of material may be based on absorption of energy, elastic and inelastic recovery, mass per unit length, total mass, and the like. Thus, mass, momentum, energy, elastic modulus, restitution (fraction of energy or momentum recovered on recoil), and other mechanical parameters may weigh in the decision.

The energy loss due to the force of cable friction of the various components, notably the spacers 24 and the latch block 18, will result in an eventual total attenuation of the momentum originally introduced by the trolley 14 and rider. Thus, at that time and at that point in space, each of the leashes 30, 32 will typically be fully extended to establish the maximum lengths, thus positioning the coupler 22 next to the impact spacer 26.

The actual locations of connections, the total lengths, and the enclosed number of springs 25 within the length of each leash 30, 32 may be engineered to obtain a desired performance. For example, stiffer springs 25 (higher spring constant) will result in a faster, more abrupt, more intense, braking and recoil force. Fewer enclosed springs 25 (captured by a leash 30, 32) may result in a softer response, but may risk "bottoming out" (fully collapsing) the springs 25 enclosed thereby. More springs 25 having a comparatively lower spring constant provide a longer and more gentle stop, with more intermediate spacers 24 absorbing momentum, for a more sluggish response to any loading (application of force; force is also mass times acceleration). This means a softer, slower acceleration and deceleration in both braking and recoil directions.

Moreover, as a general proposition, the number and location of "grouped" springs 25 captured by each leash 30, 32 is a matter of engineering design. Considerations may include and a certain amount of "rider preference" as to softness of the "stops" forward and backward. Likewise, other considerations are economical, such as optimizing throughput design, the speed of loading riders in and bringing riders off the ride. It is even conceivable to have separate stacks of springs 25 for a braking stage and a recoil stage, but that "complexifies" structures, and may even require parallel systems. The simplest arrangement is with a braking set of springs 25, and recoil subset of springs 25, all in series.

The trolley 14 and rider are both ultimately registered at the unloading station or unloading location. This occurs when the springs 25 and their capturing leashes 30, 32 come to equilibrium. Typically, this will be above a deck onto which the rider may step when released from the harness, seat, or other support system suspended from the trolley 14.

At the upper end of the cable 12 a rider begins a descent from a position of registration of the trolley 14 with the launch block 16. In the illustrated embodiment, a key 34 may be formed as part of the launch block 16 or the trolley 14. In the illustrated embodiment, the key 34 happens to be connected as part of the trolley 14. Accordingly, a slot 36 in the launch block 16 receives the key 34, thus registering the trolley 14 against rotation about the cable 12. Since the launch block 16 is fixed with respect to the cable 12, the registration in an axial direction and a circumferential direction about the cable 12 is effected by the key 34 in the slot 36. In some embodiments, a lock may secure the key 34 in the slot 36.

Meanwhile, a slot 38 may alternatively be formed in the latch block 18. Because the latch block 18 may need to rise with respect to the cable 12 in order to receive the trolley 14, a long oval or elongated circular hole may provide a slot 38 for accommodating vertical motion by the latch block 18.

Meanwhile, a rod 40 or hanger 40 may be secured into, or as part of, the trolley 14. In the illustrated embodiment, side plates 39 of the trolley 14 may capture between them other structures secured by the fasteners 13 and axles 15. However, near the bottom of the plates 39 may be positioned a gap between the side plates 39. The side plates 39 may be perforated to form a window portion 41 of a slot 42, and a well portion 43 below the window portion 41. Thus, the slot 42 may be shaped as a "T" or as an "L." Thus, the well 43 may be formed as the toe of the "T" or as the toe of the "L." The rod 40 or hanger 40 may be secured to or be formed as part of a spreader bar 44.

The rod may be turned such that it will slide upward between the side plates 39 until it is beside the window 41 or visible in the window 41 of each of the side plates 39. At that point, the rod 40 may be rotated end for end by about 90 degrees. Thus, the rod 40 then may extend out through the windows 41 in the side plates 39. A relief groove near each end of the rod 40 may then match the thicknesses of the side plates 39, in order to capture the rod 40 as it slides down into the well portion 43 of the slot 42.

At this point, the rod 40 becomes a pivot 40 by which the spreader bar 44 may be supported. Meanwhile, carabiners 46 may be inserted into the slot 42 in order to occupy the window 41 of the slot 42. This prevents the rod 40 from jumping out of the well portion 43 of the slot 42. In certain embodiments, a single carabiner 46 may suffice. In other embodiments, multiple carabiners 46 may be necessary.

Referring to FIGS. 2 through 5, while continuing to refer generally to FIGS. 1 through 7, the various components described hereinabove are illustrated in various embodiments. The trolley 14 may be provided with a bumper 48 or a bumper portion 48 that will collide or otherwise contact the face 49 of the latch block 18. As the latch block 18 approaches the trolley 14, the latch block 18 is riding (supported but slidable) the cable 12.

The encounter between the latch 50 (of the latch block 18 contacting the trolley 14), and a spur 52 or barb 52 may force the latch 50 to rise, thus lifting the latch block 18 with respect to the cable 12. Since the slot 38 in the latch block 18 is elongated, the vertical motion of the latch 50 is permitted. Thus, the latch 50 may tend to pitch 50 or lift 50, and the slide 23 will assure that the latch block 18 lifts vertically through the ways 21 of the coupler 22.

Thereafter, the sequence of momentum transfers between the trolley 14 and rider connected to the latch block 18 as they contact the impact spacer 26 will proceed as described hereinabove.

Figure 6:
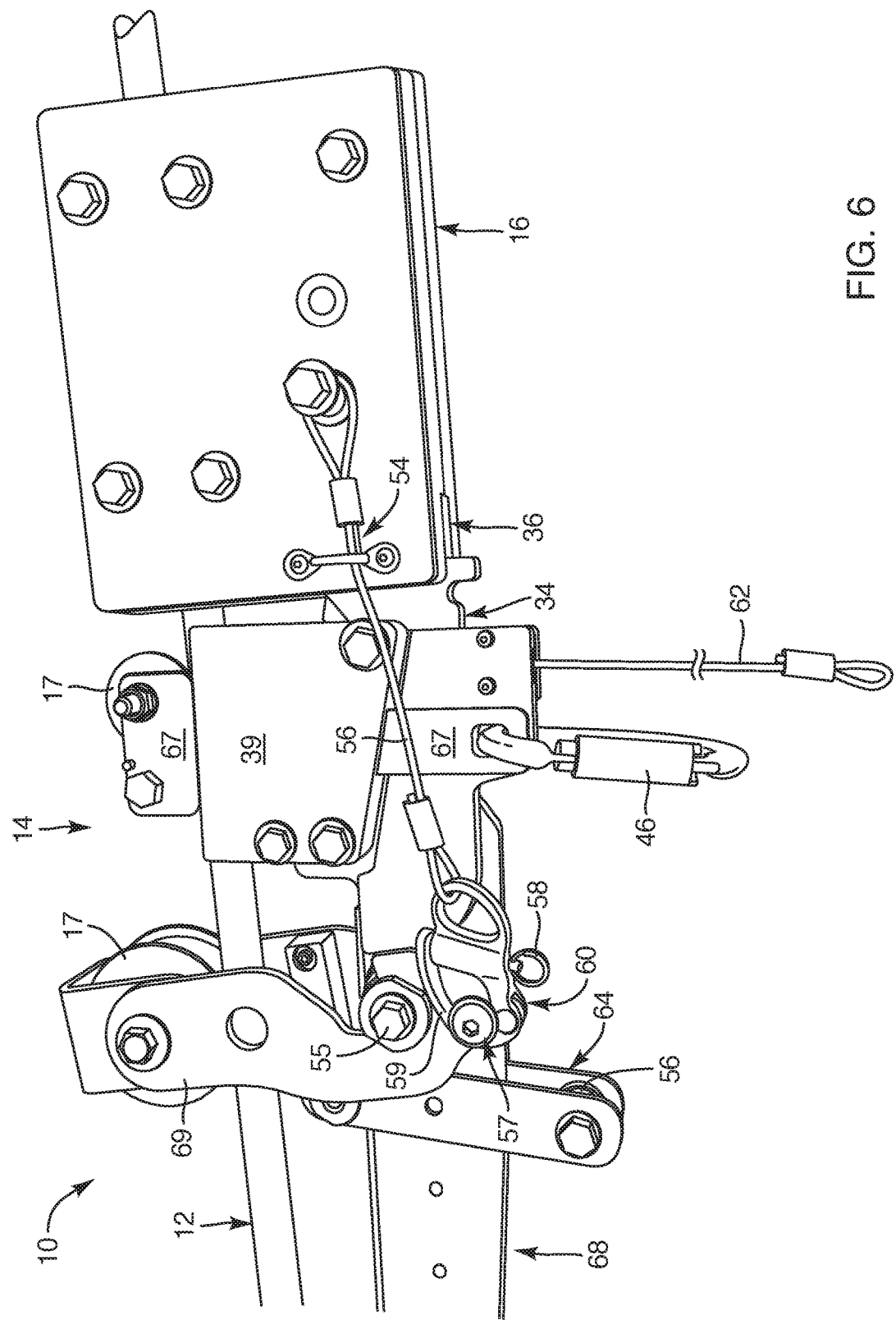
FIG. 6 is a perspective view of an alternative embodiment of a rider-controlled-braking trolley connected to a launch block by a gauge link, snap shackle, and so forth, and absent the harness, which would typically suspend from the attachment or bracket rail (frame or lever) toward the left side of the illustration.

Referring to FIG. 6, while continuing to refer generally to FIGS. 1 through 7, at the launch block 16, a trolley 14 may be registered by the key 34 in a slot 36. However, this provides rotational stability or rotary stability with respect to the cable 12. In the illustration of FIG. 6, the trolley 14 is of the rider-controlled brake type. As described in the references incorporated herein and by reference, a rider suspended from the trolley 14 may control the brake during descent. By contrast, the trolley 14 of FIGS. 1 through 5 need not involve any braking except the terminal attenuation of momentum at the bottom end of the ride.

Referring to FIG. 6, a gauge link 54, or simply a link 54 of pre-selected length, may connect the launch block 16 to the trolley 14. The gauge link may include a line 56 or a line portion 56, formed of a material, such as wire rope, cable, chain, or the like. The line 56 establishes the registration distance between the launch block 16 and the trolley 14. A release pin 58 may be used, but serves particularly well if used to release the bail 58 of a snap shackle 60.

A snap shackle 60 has the ability to hold a load, while transferring a very small fraction of that load (force) to the release pin 58. Less load results in little or no binding (distortion, friction, etc.) of the pin. Thus, the snap shackle 60 holds a much larger load than is supported by the pin, due to the shape of the bail, which provides great leverage for the pin 58.

During loading of a user supported by the trolley 14, the gauge link 54 maintains the distance, and assures the safety of the system 10. For example, the length of the gauge link 54 is selected to provide a precise fit, notwithstanding it may include a satisfactory tolerance allowing it to be easily connected to the trolley 14. However, the length is selected to limit how far the trolley and its key 34 can move from the launch block. The length assures that the key 34 remains in the slot 36, at which position the key 34 in the slot 36 of the launch block 16 resists rotation of the trolley 14 with respect to the cable 12. The launch block 16, secured to the cable 12 resists movement up the cable 12, as does gravity.

Thus, the link 54, including the line 56, any attachment brackets, loops or the like, and connectors, such as the snap shackle 60, acts as a gauge link 54 maintaining proximity of the trolley 14 to the launch block 16. Moreover, the bail 58 has a thickness designed to fit between the head of its connector post on the trolley and the swing arm 69 locking the trolley 14 onto the cable 12. One will note that the front pulley 17 in the illustrated embodiment is locked against jumping from or otherwise leaving the cable 12. It is locked on by the swing arm 69 pivoted about the axle of the pulley 17 and engaging the latch bolt 55 on the trolley. This closes the load path as a carabiner does.

The snap shackle 60 secures by its bail 59 to the connector post 57. If the connector post 57 is not sufficiently close to the launch block 16, the snap shackle 60 cannot engage it. Thus, the snap shackle 60 as part of the gauge link 54 assures that the swing arm 69 is in place to lock the trolley 14 onto the cable.

Likewise, the rear pulley 17 or wheel 17 secures to the cable 12 by a ****67 passing down parallel to the side plates 39 through a slot therewithin to protrude below. A carabiner 48 secures the slide 67 in place, assuring that the rear pulley 17 is secured to the cable 12. Thus, securement is assured, loads are all secured, and a visual inspection verifies the readiness at a glance. Meanwhile, the foregoing features act as mechanical interlocks assuring safety of the equipment and readiness for use.

Once the rider is installed in the harness suspended from the trolley 14, an operator or the rider may pull a lanyard, ring, chain, or the like and move a pin 58, releasing a bail 59 in a snap shackle 60. The bail 59 pivots with respect to the main structure of the snap shackle 60, releasing its load, and releasing the trolley 14 to proceed downhill.

The snap shackle 60 is uniquely suited to support a load, such as the weight of a rider or the vector of rider and trolley weight along the direction of the cable 12. However, the snap shackle 60 is configured such that it is capable of releasing its load, without undue binding. Thus, the shape of the bail 59 operates to easily sustain the load, and yet move, once free, and release without restraint the trolley 14 in due course.

A rider is thus released from the launch block 16, leaving the gauge link 54 behind for the next rider. In FIGS. 1 through 5, the trolley 14 needs no brake. FIG. 6 uses a rider-controlled brake. For example, by operating (pulling down on a handle of) a tether 62, having a handle that will permit the rider to draw down the tether 62. Thereby, the bracket 64 from which a rider is suspended will be moved closer toward the rear of the trolley 14. This decreases the leverage that the rider's weight exerts on the lever 68 that is the rail 68 or frame 68 of the trolley 14.

Meanwhile, the attachment 66 for a harness permits a rider to reduce force or even release the tether 62. At that event, the bracket 64 will roll forward (left) thus increasing the leverage that the rider's weight has on a brake pad riding against the cable 12 and captured within the side plates 39 of the trolley 14.

Figure 7:
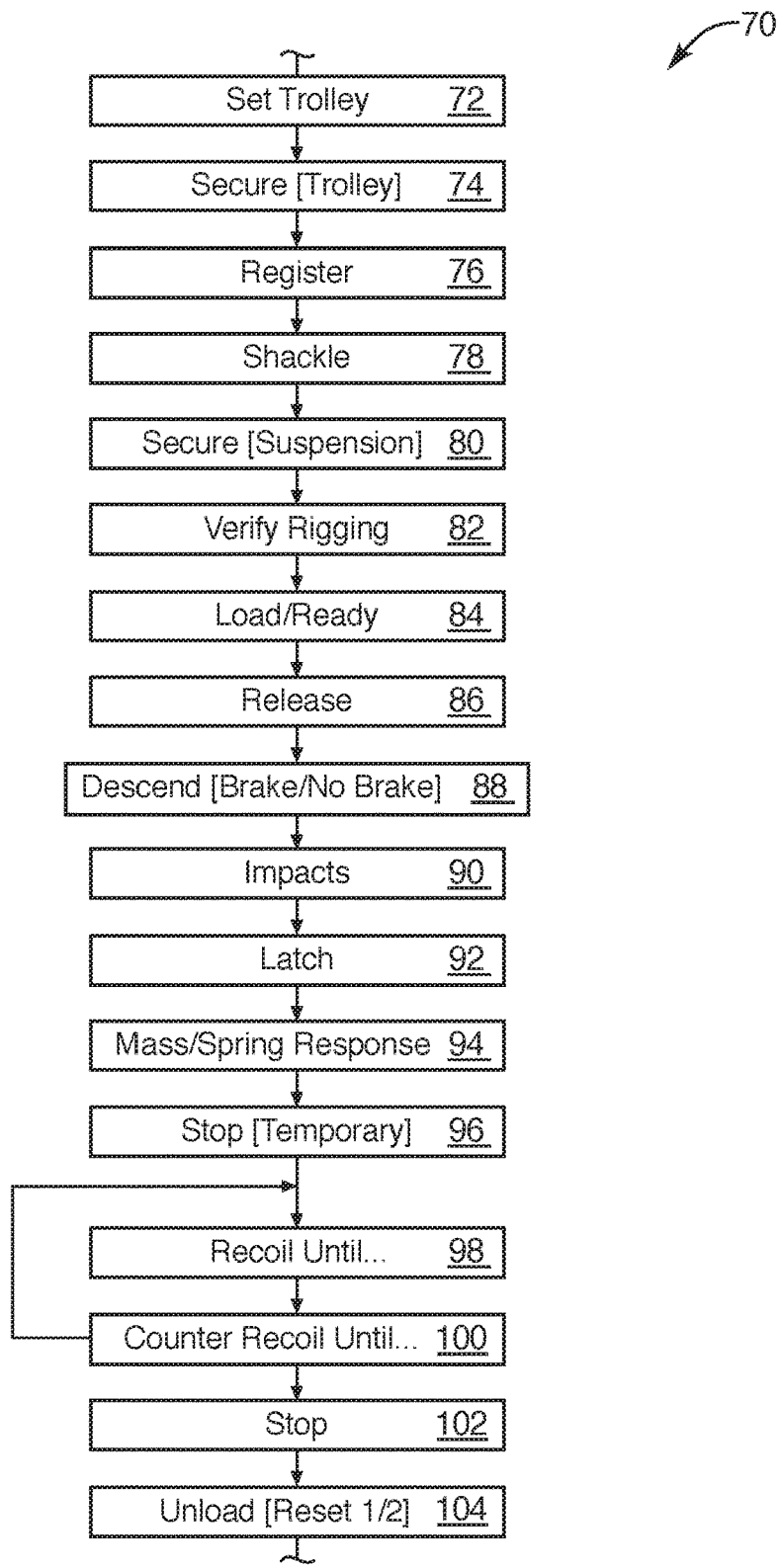
FIG. 7 is a schematic block diagram of one embodiment of a process for operating a system in accordance with the invention.

Referring to FIG. 7, a process for implementing an apparatus and method in accordance with the invention may include a procedure 70 or a process 70 that begins with a cable 12 in place between supporting towers. Typically, an entirely free span or catenary will be formed by the cable suspended from two suitable towers. The towers stand at significantly different elevations, thus providing a downhill or downward run of a trolley 14 along the cable 12.

In the process 70, setting 72 the trolley 14 may involve only returning a trolley 14 to the launch block 16, or, alternatively, actually placing a trolley 14 on the cable 12.

For example, in the embodiment of FIG. 6, the arm 69 may be rotated about its upper connection to free it from its lower connection and thus free it from its constraint to follow the cable 12. Similarly, by removing the carabiner 46 of FIG. 6, the slide 67 may be withdrawn, thereby removing its wheel 17. The trolley 14 may be removed from a cable 12 by rotating the arm 69, thus exposing the cable 12. Similarly, the slide 67 may be removed by drawing it upward. Thus removing the cable 12 from inside the trolley 14 permits the trolley 14 to remove from the cable 12.

Setting the trolley 14 on the cable 12 may be done by opening up (rotating) the arm 69 (with the trolley 14 configured without the slide 67 and its corresponding wheels 17 in place). The trolley 14 may be placed with a single front wheel 17 associated with the arm 69 on the cable 12. Thereafter, the slide 67 may be dropped into the trolley 14 and secured with a carabiner 46 to secure its respective wheel 17 to the cable 12. In this embodiment, a brake shoe rides underneath and against the cable 12, supported by the back end of the trolley 14, between the sides of the slides 67.

Setting 72 the trolley 14 by removal and replacement may be appropriate if the trolley 14 is readily removable, or is to be transported with the user who is traversing various legs of a canopy tour or the like. Otherwise, the trolley 14 may simply be set into place.

Securing 74 the embodiment of FIG. 6 may involve closing the arm 69 and locking the slide 67 with the carabiner 46. In the embodiment of FIGS. 1 through 5, the trolley 14 may be permanently attached, or may simply be removed upward once the spreader bar 44 and its locking rod 40 have been removed from the slot 42. Thus, the side plates 39 may simply permit access to the cable 12 by the trolley 14 from underneath the trolley 14.

Upon securing the trolley 74, one may register 76 the trolley 14 with the launch block 16 by placing the key 34 in the slot 36. One may then connect the snap shackle 60 of the gauge link 54 in order to secure the trolley 14 against rolling downhill away from the launch block 16 fixed to the cable 12. This increases safety in loading and frees up hands and personnel for the task.

Securing 80 the suspension operates in different ways. For example, a harness may be attached to the connector 66 suspended by the bracket 64 from the lever 68 of the trolley 14 in FIG. 6. In contrast, the spreader bar 44 with its attached harness 66 may be locked into the slot 42 as described hereinabove. Ultimately, an operator should verify 82 the rigging to be assured that the wheels 17 are properly fitted onto the cable 12, harnesses or seats are properly attached an open, that all securements such as the carabiners 46, and side plates 39 are properly in place, and so forth.

At this point one may load 84 or ready a rider in a harness suspended from the trolley 14, including re-checking rigging. Releasing 86 the snap shackle 60 or other suitable device 60 may be done once the rider is secured in the harness and comfortable that he or she is ready for a ride. Descending 88 occurs in different modes depending on the type of trolley 14 involved. For example, those trolleys 14 without a brake will simply come to some terminal velocity dictated by air drag and rolling friction.

Others such as the tour trolley 14 of FIG. 6 will be controlled by application of the weight of a user to the lever 68 through the bracket 64 from which the user is suspended. In this way, the user pulling on the tether 62 may reduce the braking by pulling the bracket 64 (and thus the effective weight of the user) closer to the point of pivoting. This is described in great detail in the patents incorporated herein by reference. Likewise, those patents also describe in detail automatic braking mechanisms on a trolley 14 traveling down the cable 12.

Ultimately, impacts occur between first the trolley 14 and the latch 50 of the latch block 18. This is followed by impact 5 of the bumper 48 of the trolley 14 against the face 49 of the latch block 18. Promptly thereafter, the coupler 22 driven by the latch block 18 and the momentum of a rider suspended from the trolley 14 will impact the impact spacer 26, if they are not already in contact.

The latch 50 will latch 92 onto the spur 52 of the trolley 14, thus locking or latching 92 them together. Thus, the relative motion in the axial direction (along the cable 12) is extremely limited (approximately fixed, axially) between the trolley 14, the latch block 18, and the coupler 22.

The response 94 of the spring stack 27, including each of the spacers 24 and springs 25, will occur in response to the momentum of the trolley 14 and rider imposed thereon. Ultimately, between the acceleration of the masses of the spacers 24 and springs 25, and the elastic deflection (compression) of the springs 25, all the momentum from the trolley 14 and latch block 18 in the downward direction along the cable 12 will be transferred into the spring stack 27. The resulting stop 96 will be temporary, even momentary.

Thereafter, recoil 98 proceeds as the spring stack 27 begins to expand, reversing the direction of the trolley 14 and rider, and pushing them away from the lower end of the cable 12 and its lower suspension tower. Counter-recoil will occur as described hereinabove. The recoil leash 32 that compressed all the springs between the recoil spacer 28 and the impact spacer 26 during recoil will draw the trolley 14 toward the impact spacer again. Thus, momentum will continue to transfer as the entire spring stack 27, and then the subset thereof located between the impact spacer 26 and the recoil spacer 28 continue to urge the trolley 14 to the equilibrium position. Properly sized and loaded, the spring stack will be at equilibrium at full extension of the impact leash 30, and in most, typical circumstances, full extension of the recoil leash 32.

Ultimately after cycling through recoil 98 and counter recoil 100, the trolley 14 comes to a stop 102 after which unloading 104 may be safely done. Optionally, unloading 104 may involve resetting the trolley 14 or moving it to be set 72 on another cable 12.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a cable suspended freely as a clear span between a first (higher) end and a second (lower) end thereof to support a trolley rollable therealong from proximate the first end to proximate the second end;
   an attenuator extending from proximate the second end a distance selected to attenuate momentum, corresponding to the trolley;
   the attenuator, comprising springs arranged in a first set compressible toward the second end in response to the momentum, and a second set as a subset of the first set, arranged to compress toward the first end;
   a first tether having a first tether end point spaced from the second end, the first tether being connected to limit to the first tether end point expansion toward the first end by the first set; and
   a second tether operably connected to compress the second set toward the first tether end point in response to recoil of the trolley toward the first end.

2. The apparatus of claim 1, comprising:
   a latch operable to secure the trolley to the second set upon initiation of a compression of the first set in response to the momentum.

3. The apparatus of claim 2, wherein:
   the springs of the first set are operably connected to receive a first portion of the momentum; and
   the first set comprises first masses interspersed between the springs therein to receive a second portion of the momentum.

4. The apparatus of claim 2, wherein the distance is selected to distribute the first portion of the momentum gradually and elastically at a rate selected to safely halt travel toward the second end of a load carried by the trolley.

5. The apparatus of claim 4, wherein:
   the first tether extends from proximate the second end toward the first end a length corresponding to the distance; and
   the second tether extends from the latch to a position dividing the second set from the third set.

6. The apparatus of claim 5, wherein the first tether and second tether are formed of a material comparatively inextensible in an axial direction along the cable and comparatively flexible orthogonally thereto.

7. The apparatus of claim 1, further comprising:
   a launch block fixed to the cable proximate the first end;
   the launch block, shaped to register the trolley with respect to the cable and fixed with respect to the cable in all dimensions;
   the trolley, shaped to register with the launch block in two dimensions;
   a link flexible laterally but inflexible in length to hold in mutual engagement and registration the launch block with the trolley in the longitudinal direction;
   a key extending from at least one of the trolley and the launch block and effective to register the trolley in a circumferential direction orthogonal to the longitudinal direction; and
   a receiving slot formed in the other of the trolley and the launch block and having side surfaces registering with the key to resist relative rotation therebetween about the cable.

8. The apparatus of claim 1, further comprising:
   the springs sized, shaped, and positioned to receive a first portion of the momentum elastically, stored as compression of the springs;
   spacers, each comprising a spacer mass corresponding thereto and positioned between adjacent ones of the springs; and
   the spacers sized and shaped to travel along the cable absorbing a second portion of the momentum by at least one of acceleration of the spacer mass thereof and frictional drag.

9. The apparatus of claim 1, wherein:
   the first and second sets are operably connected to stabilize a set equilibrium position between the sets, maintained by the first tether retaining the first set against escape from the second end, and the second tether retaining the second set against movement toward the second end;

a latch is operable to disengage from the trolley when the trolley stops stably at a trolley equilibrium position at the distance from the second end;

the trolley is configured to be removable, completely intact, from the cable at the trolley equilibrium position, without tools.

10. The apparatus of claim 1, further comprising:

the trolley, a seat suspended from the trolley and shaped to support a user, and a release operable, by a rider in the seat, to free the trolley to descend the cable from proximate the first end.

11. A method comprising:

selecting an apparatus comprising a cable suspended freely as a catenary between a first (higher) end and a second (lower) end thereof;

providing an attenuator comprising springs extending toward the first end from an anchor point, proximate the second end, to a terminal point defined by a first tether movable toward the first end a limited distance away from the anchor point;

arranging the springs in a first set, compressible away from the terminal point and toward the second end in response to momentum applied thereto by a load descending the cable, and a second set as a subset of the first set, arranged to compress toward the terminal point in response to recoil of a second tether securing to the load to compress the second set toward the terminal point in response to the load recoiling away from the second end;

launching the load to descend from proximate the first end along the cable;

moving the terminal point toward the second end by compressing the first set in response to momentum of the load;

recoiling, by the load in response to expansion of the first set toward the terminal point;

returning the load and terminal point to a load equilibrium position by compression of the second set against the terminal point in response to the recoil followed by expansion thereof from the terminal point toward the anchor point.

12. The method of claim 11, wherein each spring has a spring constant, corresponding thereto and defining a force per unit of deflection thereof along the cable.

13. The method of claim 12, comprising absorbing a first portion of the momentum in the springs and a second portion of the momentum is spacer masses positioned between adjacent ones of the springs.

14. The method of claim 11, comprising latching the load to compress the second set by moving away from the terminal point, upon recoil of the load in response to expansion of the first set following compression of the first set toward the anchor point.

15. The method of claim 11, comprising releasing the latch when the load is positioned and stationary at the terminal point.

16. The method of claim 11 comprising registering and securing the load at a launch block proximate the first end against movement of the load in a longitudinal direction along the cable.

17. The method of claim 11, wherein:

a seat is suspended from a trolley and shaped to support a user as a portion of the load, below the cable; and the method comprises releasing, by at least one of an operator proximate the seat and a rider in the seat, the trolley to descend from the proximate the first end toward the terminal point.

18. The method of claim 11, wherein:

the springs are each characterized by a spring constant corresponding thereto and defining a force per unit of deflection along the direction of the cable;

spacers, each comprising a spacer mass corresponding thereto are positioned between adjacent ones of the springs; and a latch is positioned to capture the load upon arrival proximate the first set to restrain the trolley from recoiling away from the second set.

* * * * *